United States Patent [19]

Yamada

[11] Patent Number: 4,907,106
[45] Date of Patent: Mar. 6, 1990

[54] HEAD SLIDER DRIVING MECHANISM FOR A MAGNETIC DISK APPARATUS

[75] Inventor: Tadaharu Yamada, Tokyo, Japan

[73] Assignee: NEC Corporation, Tokyo, Japan

[21] Appl. No.: 144,981

[22] Filed: Jan. 19, 1988

[30] Foreign Application Priority Data

Jan. 19, 1987 [JP] Japan .................................. 62-10308

[51] Int. Cl.⁴ .......................... G11B 5/54; G11B 21/02
[52] U.S. Cl. ................................... 360/75; 360/78.04; 360/103
[58] Field of Search ....................... 360/75, 103, 97–99, 360/102, 105, 106, 78, 74.1, 78.04, 78.08, 99.01

[56] References Cited

U.S. PATENT DOCUMENTS

| | | | |
|---|---|---|---|
| 3,823,416 | 7/1974 | Warner | 360/103 |
| 4,530,021 | 7/1985 | Cameron | 360/103 |
| 4,542,429 | 9/1985 | Nishida et al. | 360/103 |
| 4,589,036 | 5/1986 | Bertschy et al. | 360/75 |

FOREIGN PATENT DOCUMENTS

| | | | |
|---|---|---|---|
| 57-103161 | 6/1982 | Japan | 360/75 |
| 58-1858 | 1/1983 | Japan | 360/75 |
| 60-242550 | 12/1985 | Japan | 360/75 |
| 2166279 | 4/1986 | United Kingdom | 360/103 |

OTHER PUBLICATIONS

IBM, TDB, vol. 21, No. 11, "Landing of Magnetic Heads on Disks" Uy, 4/79, p. 4647.

*Primary Examiner*—Aristotelis M. Psitos
*Assistant Examiner*—Steven R. Garland
*Attorney, Agent, or Firm*—Sughrue, Mion, Zinn, Macpeak & Seas

[57] ABSTRACT

A head driving system for a magnetic disk includes a controller which drives the head slider radially during times before takeoff and after landing of the head slider. A decrease in sliding abrasion per unit area of the takeoff and landing zone due to the radial movement of the slider results in less net abrasion damage and prolongs the life of the disk apparatus.

14 Claims, 2 Drawing Sheets

HEAD SLIDER DRIVING MECHANISM FOR A MAGNETIC DISK APPARATUS

BACKGROUND OF THE INVENTION

The present invention relates to a magnetic disk apparatus and, more particularly, to a magnetic disk apparatus comprising an air bearing head slider which flies over a surface of a rotating magnetic disk using a contact-start-stop technique wherein the head slider contacts the magnetic disk surface when the magnetic disk stops.

A magnetic disk apparatus of this kind comprises a spindle motor for rotating the magnetic disk and a head slider provided with an electromagnetic transducer thereon. The head slider is supported by a flexible suspension member to face the magnetic disk surface. The suspension member is fastened to a head arm driven by a head position actuator. Due to the air pressure caused by the rotation of the magnetic disk, the head slider flies at a constant spacing from the magnetic disk. Under this condition, the position actuator moves the head slider in a radial direction of the magnetic disk to position the transducer at the object track on the magnetic disk.

In response to the stoppage of the magnetic disk, the head slider contacts the surface of the magnetic disk by means of the resilient force of the suspension member. As is described in U.S. Pat. No. 4,194,226, in order to avoid contacting the head slider with the data zone on the surface of the magnetic disk, there is provided a contact-start-stop zone (hereunder referred to as "CSS zone") or landing zone at the innermost or outermost circumference of the disk. When the magnetic disk apparatus is not operated, that is, the disk does not rotate, the head slider is disposed at a position in the CSS zone and contacts the magnetic disk. Upon start-up of the magnetic disk apparatus, the head slider is retained at a position in the CSS zone until the rotation of the magnetic disk reaches a constant speed. Therefore, the head slider slides upon the CSS zone on the surface of the magnetic disk, until it becomes airborne. At the termination of the disk operation, the rotation of the magnetic disk is stopped after the head slider is again positioned in the CSS zone. Therefore, as the rotational speed of the disk decreases, the head slider gradually approaches the CSS zone of the disk surface and finally slides on the CSS zone. When the disk stops completely, the head slider contacts a portion of the CSS zone. Thus, the CSS zone is used as a runway for the head slider.

The conventional magnetic disk apparatus is constructed so that the head slider is positioned at the same location (same track) within the CSS zone during the rotation start and stop periods of the magnetic disk. Therefore, the frictional force applied by the suspension member is applied to the same portion of the surface of the CSS zone for each start/stop of the disk. The abrasion of the head slider against the magnetic disk due to the sliding contact shortens the life of the magnetic disk apparatus. Since the material of the head slider is usually harder than that of the magnetic disk, the abrasion of the magnetic disk is more important. If it is assumed that the amount of abrasion of the disk in the CSS zone per unit length is $V_w$, the circumferential length of the CSS zone is $l_c$, the number of revolutions required to achieve complete flying of the head slider is $N_t$, and the length of the head slider is $L_s$, the following relation is approximately established among the above quantities.

$$V_w \propto N_t L_s / l_c \qquad (1)$$

From equation (1), it is obvious that $V_w$ becomes greater as $l_c$ decreases. In other words, magnetic disks of smaller radius, such as 5.25 and 3.5 inches, suffer from considerable abrasion. In order to overcome this problem, either $N_t$ or $L_s$, or both must be chosen to be small. However, this has been found to be impossible for the following reasons. First, in order to make $N_t$ small, it is necessary to use a spindle motor whose rotation rapidly reaches the constant speed. This inevitably causes the size of the spindle motor to be large, so that it is not suitable for a magnetic disk apparatus of small disk size. Next, the selection of small $L_s$ is limited due to the size and shape of the magnetic head slider, which are determined by electromagnetic requirements and by the requirement to obtain the necessary flying height.

Since dust produced due to the abrasion of the magnetic disk may find its way into the gap between the head slider and the disk during read/write operation, it is possible that the suspension member of the head slider and the surface of the disk may be irreparably damaged. This phenomenon is known as "head crash".

SUMMARY OF THE INVENTION

An object of the present invention is, therefore, to provide a head slider driving mechanism wherein the abrasion of the magnetic disk in the CSS zone can be reduced.

An another object of the present invention is to provide a highly reliable magnetic disk apparatus suited to long use.

According to one aspect of present invention, there is provided a head slider driving mechinism which comprises: a magnetic disk including contact-start-stop and data areas separated from each other in a radial direction of the magnetic disk, a spindle motor for rotating the magnetic disk, a head slider opposed to a surface of the magnetic disk and which flies over the surface of the magnetic disk due to an air cushion produced by rotation of the magnetic disk, a position actuator mechanism for positioning the head slider in a radial direction of the magnetic disk, and control means for positioning the head slider over the contact-start-stop area when the spindle motor stops rotation the magnetic disk, the control means driving the head slider in the radial direction of the magnetic disk within the contact-start-stop area during a first sliding period in which the head slider slides upon the surface of said magnetic disk immediately after the spindle motor starts rotating the magnetic disk.

BRIEF DESCRIPTION OF THE DRAWINGS

Other objects and advantages of the present invention will be better understood from the following description of a preferred embodiment in conjunction with the accompanying drawings wherein.

In these drawings, like reference numerals refer to the same structural elements.

DESCRIPTION OF THE PREFERRED EMBODIMENT

Figure 1:
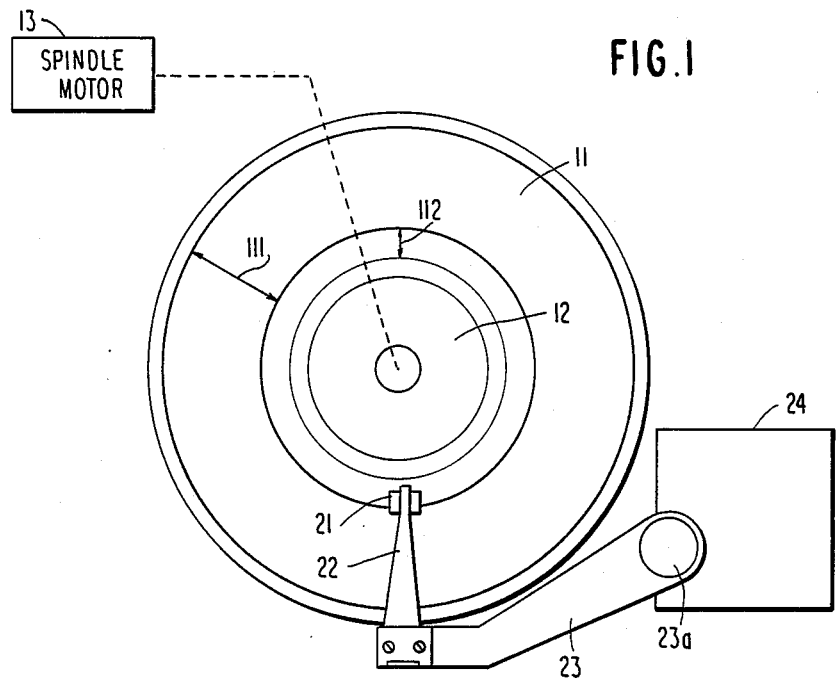
FIG. 1 is a plan view of an embodiment of the invention.
Figure 2:
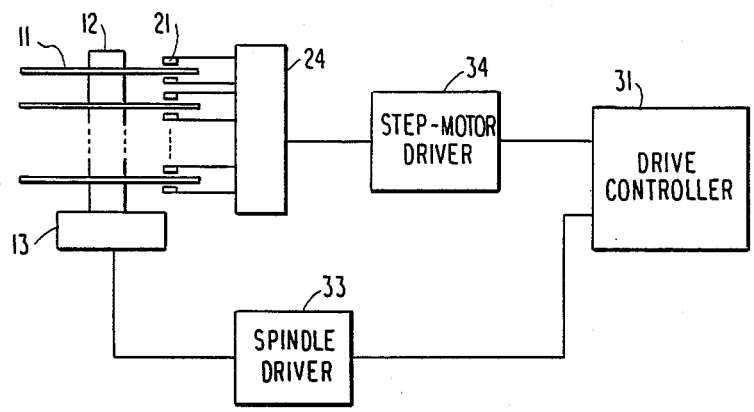
FIG. 2 is a block diagram of the embodiment of the invention.

Referring to FIGS. 1 and 2, plural magnetic disks 11 are fastened to a spindle 12 and rotated by a spindle motor 13. Each of the magnetic disks 11 has a diameter of 3.5 inches and is a rigid disk comprising a magnetic film fabricated upon an aluminum substrate. The spindle motor 13 rotates at a constant speed of 3,600 r.p.m. (revolutions per minute) by means of a spindle driver 33, which receives a rotation start command from a disk drive controller 31. The surface of the magnetic disk 11 is divided into a data area 111 for recording information, and a contact-start-stop (CSS) area 112 disposed inwardly of the data area 111 and which does not record information. The widths of the data area 111 and the CSS area 112 range, in a radial direction of the magnetic disk, from 25 mm to 43 mm and from 20 mm to 24.7 mm, respectively.

A head slider 21 made of a hard material such as $Al_2O_3$-TiC, is supported by a flexible suspension member 22. The suspension member 22 is supported by a rigid head arm 23. The head arm 23 is engaged with a driving shaft of a stepping motor 24 for positioning the head slider 21. The stepping motor 24 rotates the head arm 23 around a pivot axis 23a to move the head slider 21 in the radial direction of the magnetic disk 11, with the result that an electromagnetic transducer on the head slider 21 is positioned over the object track of the disk 11. Distance and directional information on the head slider movement is given to a stepping motor driver 34 by the drive controller 31. The stepping motor driver 34 energizes respective phases of the stepping motor 24 in response to the information given by the controller 31. In the embodiment of the invention, the one rotary step of the stepping motor 24 drives the head slider 21 by 30 $\mu$m (microns) in the radial direction of the magnetic disk 11. Namely, the track pitch in the data area 111 is 30 $\mu$m. As is well known in the art, the magnetic disk 111, head slider 21 and the suspension member 22, etc. are enclosed in a housing (not shown) to seal the same from the external environment.

The above-mentioned structure is well known in the art, except that the CSS zone 112 is radially wider than that conventionally used. For example, the details of construction of the head slider 21 and the suspension member 22 are disclosed in U.S. Pat. No. 4,167,765. The fundamental structure of the head slider 21 is disclosed in U.S. Pat. No. 3,823,416. The position actuator for the head slider 21 can be realized by means of either a rotary actuator, as is described in the embodiment of the invention and also disclosed in U.S. Pat. No. 4,194,226, or a linear actuator, as is disclosed in U.S. patent application Ser. No. 706,422 filed on February 27, 1985 and assigned to the same assignee.

Figure 3:
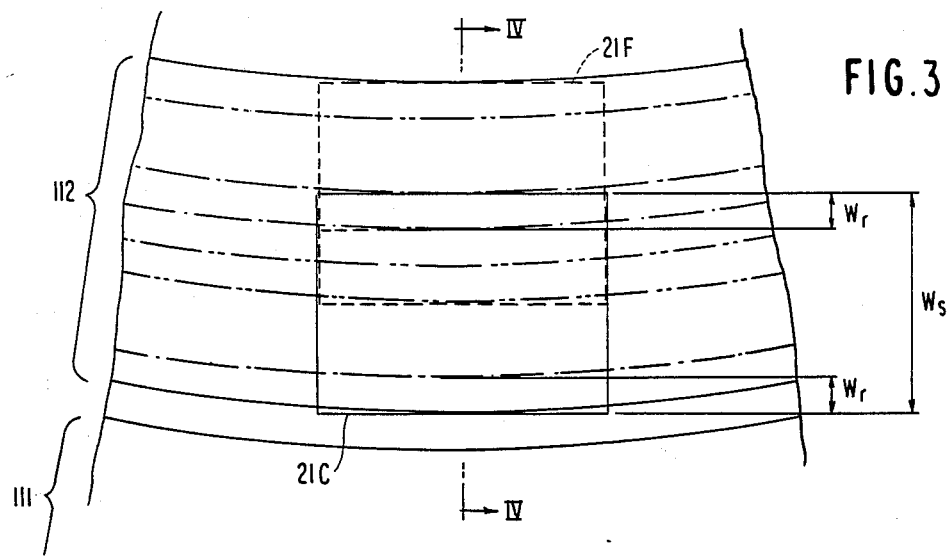
FIG. 3 is a plan view for describing the operation of the embodiment of the invention.
Figure 4:
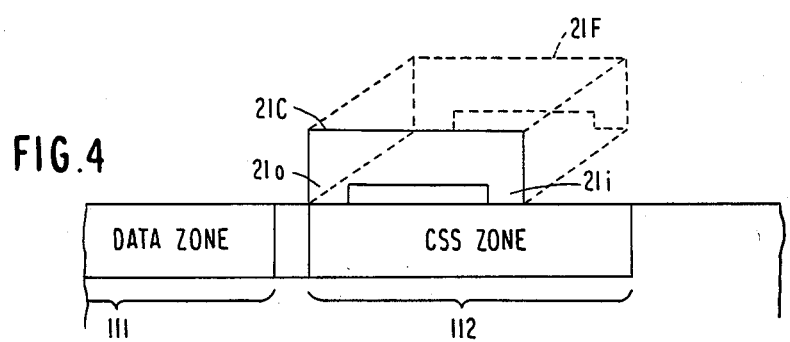
FIG. 4 is a sectional view taken along lines IV—IV of FIG. 3.

Referring also to FIGS. 3 and 4, the operation of the embodiment of the invention will be described. When the magnetic disk 11 does not rotate, the controller 31 locates the head slider 21 at a position 21C, which is at the outermost periphery of the CSS zone 112. The position 21C is indicated by a solid line in FIG. 3. In the embodiment of the invention, the total width of the head slider 21 is 3.2 mm, while the width $W_r$ of the outer and inner side rails 21o and 21i is 0.5 mm. Therefore, the head slider 21 stops in contact with a portion of the area enclosed by concentric circumferences of radii 21.5 and 24.7 in the CSS zone 112.

With a power switch of the magnetic disk apparatus turned on, the controller 31 starts the spindle motor 13 by means of the spindle driver 33. Simultaneously, the controller 31 drives the head slider 21 by 1.5 mm in an inner radial direction of the magnetic disk 11 by means of the stepping motor driver 34 and the stepping motor 24. Thus, the head slider 21 moves by a distance three times as large as the width of the side rails 21o and 21i, and moves to a position 21F indicated by a dotted line in FIG. 3. During this movement, due to the increase of air pressure caused by the increase of the rotational speed of the magnetic disk 11, the head slider 21 lifts off from the surface of the magnetic disk 11. The traces of the side rails 21o and 21i within the CSS zone 112 gradually change from those shown by the one-dot and dashed lines in FIG. 3, immediately after the start of disk rotation, to positions closer to the inner periphery, and finally to the position shown by double-dot and dashed lines in FIG. 3 when the head slider 21 lifts off from the surface of the magnetic disk 11. Thus, up until the time the head slider 21 flies over the disk surface, the head slider 21 does not slide only upon the same circumferential portion of the CSS zone 112, but its sliding position gradually changes in a radially inward direction. As a result, abrasion of the CSS zone due to the sliding movement of the head slider 21 is distributed in a radial direction. In the embodiment of the invention, the head slider 21 is driven radially by a distance three times as large as the width of the side rails 21o and 21i. Therefore, the abrasion per unit area of the CSS zone 112 decreases by approximately one third.

Figure 5:
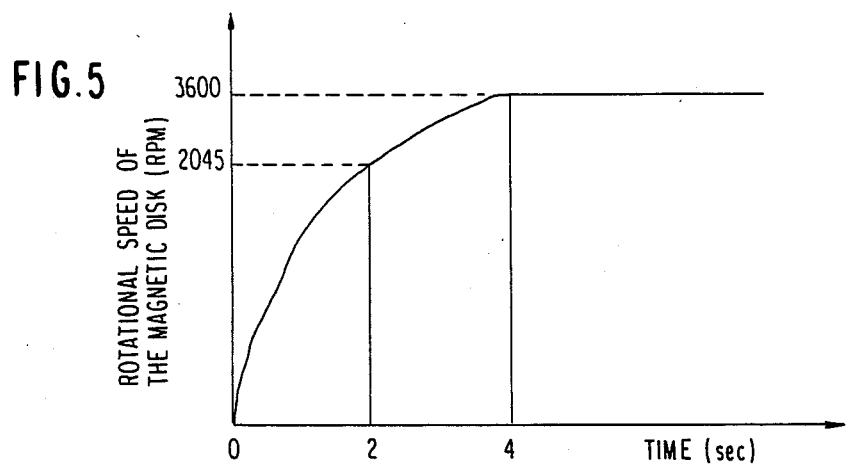
FIG. 5 shows how the rotational speed of the magnetic disk of FIG. 1 varies with time after starting.

FIG. 5 shows the change of the r.p.m. of the magnetic disk 11 after the spindle motor 13 starts. After the start (T=0), the speed increases rapidly and reaches a constant speed at 3,600 r.p.m. 4 seconds later. The head slider 21 lifts off the disk surface at a circumferential speed of about 5 m/sec due to the air pressure caused by the disk rotation. Since the CSS zone 112 exists in a concentric circumferential area of radii from 20 to 24.7 mm, the circumferential speed of 5 m/sec at this radius range is obtained at approximately 2,045 r.p.m.. This speed can be attained about 2 seconds after the magnetic disk 11 starts to rotate. In other words, during about 2 seconds after the start of rotation the head slider 21 slides on the surface of the disk 11. Therefore, the controller 31 controls the stepping motor 24 such that the head slider 21 is driven by 1.5 mm in an inner radial direction during the 2 seconds after the start of the spindle motor 13. As is described above, since the head slider 21 is moved by 30 $\mu$m increments due to the minimum rotation of the stepping motor 24, the controller 31 applies a driving pulse to the driver 34 each 40 m/sec during the 2 seconds after the start of rotation of the disk 11 so as in drive the head slider 21 to an inner radial direction during this time. Thus, during the first 2 seconds, 50 driving pulses are applied to the driver 34, and the head slider 21 is driven by 30 $\mu$m $\times$ 50 = 1,500 $\mu$m.

Thereafter, the controller 31 waits until the speed of the disk 11 reaches 3,600 r.p.m., retaining the head slider 21 at the position 21 F. Upon reaching 3,600 r.p.m., the circumferential speed of the CSS zone 112 is about 8.5 m/sec and the space between the head slider and the disk surface reaches about 0.3 $\mu$m, with the result that the read/write operation is possible. Beginning at this moment, the controller 31 starts to move the head slider 21 to the object track in the data area 111 to record or read information.

After the read/write operation is completed, the controller 31 locates the head slider 21 at position 21F in the CSS zone 112 before the rotation of the disk 11 is to be stopped. In response to the stop command of the spindle motor 13, the rotational speed of the disk 11 decreases along the curve shown in FIG. 5 in the direction reverse to the starting process. Specifically, the disk 11 stops at about 4 seconds after the stop command of the spindle motor 13 is issued. The controller 31 retains the head slider 21 at position 21F for 2 seconds after issuing the stop command of the spindle motor 13.

When the speed decreases to about 2,045 r.p.m., the controller 31 begins to drive the head slider 21, so that the head slider 21 is moved in an outer radial direction of the disk 11 by 1.5 mm within 2 seconds, until the disk 11 stops completely. In other words, the controller 31 applies a driving pulse to the driver 34 each 40 msec such that the head slider 21 is incrementally moved to the position 21C. Upon stoppage of the disk rotation, the head slider 21 is in contact with the surface of the disk 11 at position 21C. Therefore, in the disk stopping operation the head slider 21 is gradually driven in the outer radial direction with its surface sliding on the surface of the disk 11. As a result, the abrasion per unit surface area of the CSS zone 112 decreases.

In the embodiment of the invention described above, the head slider 21 is driven to move in an inner radial direction during the start of rotation of the disk 11, while it is made to move in an outer radial direction during the stop of rotation of the disk 11. However, the moving directions are not so limited. Namely, the same advantage can be obtained when the head slider 21 is driven in an outer radial direction during the start of disk rotation, and in the reverse direction during the stop of disk rotation. In this case, the contact position of the head slider 21 with the surface of the disk 11 during stoppage should be chosen to be the innermost circumference of the CSS zone 112 (position 21F).

Moreover, the movement of the head slider 21 during the start and stop of disk rotation is not limited to one direction. It can be moved repeatedly in both directions. Also, it is possible to make the driving direction identical in the starting and stopping operations, so that the stop point of the head slider 21 alternatingly at positions 21C and 21F.

Although in the embodiment of the invention, the head slider 21 is moved by a distance three times as large as the width of the side rails 21o and 21i, it is sufficent if the movement distance is at least the width of the side rails 21o and 21i (0.5 mm). By selecting the driving distance of the head slider 21 to be n (n: integer) times as large as the width of the side rail, the abrasion per unit area of the CSS zone 112 decreases approximately one n-th.

As is described above, the present invention provides the advantage that the abrasion of the CSS zone is reduced by driving the head slider in a radial direction immediately after the disk starts rotating and before the disk stops rotating. Therefore, the life of the magnetic disk apparatus can be prolonged.

What is claimed is:
1. A head slider driving mechanism for a magnetic disk apparatus, comprising:
a magnetic disk including contact-start-stop and data areas separated from each other in a radial direction of said magnetic disk;
motor means for rotating said magnetic disk;
a head slider opposed to a surface of said magnetic disk and flying over said surface due to air pressure produced during rotation of said magnetic disk;
a position actuator mechanism for positioning said head slider in a radial direction of said magnetic disk; and
control means for controlling said position actuator mechanism so as to position said head slider within said contact-start-stop area when said motor means stops the rotation of said magnetic disk, said control means controlling said position actuator mechanism to start to effect the driving of said head slider in a radial direction of said magnetic disk within said contact-start-stop area during a first sliding period in which said head slider slides upon and lifts off from the surface of said magnetic disk at substantially the same time said motor means starts rotating said magnetic disk, and said control means controlling said position actuator mechanism to drive said head slider in a radial direction within said contact-start-stop area during a second sliding period in which said head slider lands on and slides upon the surface of said magnetic disk immediately before said motor means stops rotation of said magnetic disk.

2. The head slider driving mechanism for a magnetic disk apparatus as claimed in claim 1, wherein said control means drives said head slider in an inner radial direction of said magnetic disk during said first sliding period and drives said head slider in an outer radial direction of said magnetic disk during said second sliding period.

3. The head slider driving mechanism for a magnetic disk apparatus as claimed in claim 1, wherein said head slider comprises side rails extending perpendicularly to a radial direction of said disk and wherein said control means drives said head slider in a radial direction by an amount larger than a width of one of said side rails during said first period.

4. The head slider driving mechanism for a magnetic disk apparatus as claimed in claim 1, wherein said control means controls said position actuator mechanism to drive said head slider in a radial direction during a predetermined time interval within said first sliding period.

5. The head slider driving mechanism for a magnetic disk apparatus as claimed in claim 1, wherein said head slider is driven by means of said position actuator mechanism during said first sliding period.

6. The head slider driving mechanism for a magnetic disk apparatus as claimed in claim 1, wherein said head slider is radially driven by said position actuator mechanism for approximately two seconds during said first sliding period and during said second sliding period.

7. The head slider driving mechanism for a magnetic disk apparatus as claimed in claim 1, wherein said contact-start-stop area is located at an inner periphery of said magnetic disk.

8. A head slider driving mechanism for a magnetic disk apparatus, comprising:
a magnetic disk including contact-start-stop and data areas separated from each other in a radial direction of said magnetic disk;
motor means for rotating said magnetic disk;

a head slider opposed to a surface of said magnetic disk and flying over said surface due to air pressure produced during rotation of said magnetic disk, said head slider comprising side rails extending perpendicularly to said radial direction, and said contact-start-stop area having a radial width which is greater than a width of said head slider by an amount corresponding to at least one width of one of said side rails;

a position actuator mechanism for positioning said head slider in a radial direction of said magnetic disk; and control means for controlling said position actuator mechanism so as to position said head slider within said contact-start-stop area when said motor means stops the rotation of said magnetic disk, said control means controlling said position actuator mechanism to start to effect the driving of said head slider in a radial direction of said magnetic disk within said contact-start-stop area during a first sliding period in which said head slider slides upon and lifts off from the surface of said magnetic disk at substantially the same time said motor means starts rotating said magnetic disk.

9. The head slider driving mechanism for a magnetic disk apparatus as claimed in claim 8, wherein said control means controls said position actuator mechanism to drive said head slider in a radial direction within said contact-start-stop area during a second sliding period in which said head slider lands on and slides upon the surface of said magnetic disk immediately before said motor means stops rotation of said magnetic disk.

10. The head slider driving mechanism for a magnetic disk apparatus as claimed in claim 8, wherein said control means controls said position actuator mechanism to drive said head slider in a radial direction by an amount larger than the width of one of said rails during said first period.

11. The head slider driving mechanism for a magnetic disk apparatus as claimed in claim 8, wherein said control means controls said position actuator mechanism to drive said head slider in a radial direction during a predetermined time interval within said first sliding period.

12. The head slider driving mechanism for a magnetic disk apparatus as claimed in claim 8, wherein said control means controls said position actuator mechanism to drive said head slider in a radial direction within said contact-start-stop area during a second sliding period in which said head slider lands on and slides upon the surface of said magnetic disk immediately before said motor means stops rotation of said magnetic disk, and wherein said head slider is radially driven by said position actuator mechanism for approximately two seconds during said first sliding period and during said second sliding period.

13. The head slider driving mechanism for a magnetic disk apparatus as claimed in claim 8, wherein said head slider is driven by means of said position actuator mechanism during said first sliding period.

14. The head slider driving mechanism for a magnetic disk apparatus as claimed in claim 8, wherein said contact-start-stop area is located at an inner periphery of said magnetic disk.

* * * * *

UNITED STATES PATENT AND TRADEMARK OFFICE
CERTIFICATE OF CORRECTION

PATENT NO. : 4,907,106

DATED : MARCH 6, 1990

INVENTOR(S) : TADAHARU YAMADA

It is certified that error appears in the above-identified patent and that said Letters Patent is hereby corrected as shown below:

Column 5, line 48, after "21" insert --is--.

Signed and Sealed this

Second Day of July, 1991

Attest:

Attesting Officer

HARRY F. MANBECK, JR.

Commissioner of Patents and Trademarks